United States Patent
Hattori et al.

(10) Patent No.: US 8,595,399 B2
(45) Date of Patent: Nov. 26, 2013

(54) VIDEO/SOUND SIGNAL TRANSMITTING SYSTEM AND VIDEO/SOUND SIGNAL SWITCHING AND DISTRIBUTING DEVICE

(75) Inventors: Toshikazu Hattori, Kanagawa (JP); Susumu Ibaraki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 86 days.

(21) Appl. No.: 13/498,942

(22) PCT Filed: Jul. 1, 2010

(86) PCT No.: PCT/JP2010/004344
§ 371 (c)(1), (2), (4) Date: Mar. 29, 2012

(87) PCT Pub. No.: WO2011/039913
PCT Pub. Date: Apr. 7, 2011

(65) Prior Publication Data
US 2012/0182481 A1    Jul. 19, 2012

(30) Foreign Application Priority Data
Sep. 29, 2009    (JP) ................................ 2009-223989

(51) Int. Cl.
G06F 13/00    (2006.01)
G06F 3/00    (2006.01)

(52) U.S. Cl.
USPC .......... 710/104; 710/2; 710/5; 710/8; 710/32; 710/74

(58) Field of Classification Search
None
See application file for complete search history.

(56) References Cited

U.S. PATENT DOCUMENTS

| 2004/0095509 | A1 | 5/2004 | Okamoto | |
|---|---|---|---|---|
| 2007/0168663 | A1* | 7/2007 | Hirai et al. | 713/169 |
| 2007/0204182 | A1* | 8/2007 | Moriai | 713/320 |
| 2008/0307496 | A1 | 12/2008 | Kurose | |
| 2009/0144805 | A1 | 6/2009 | Araki | |

FOREIGN PATENT DOCUMENTS

| DE | 102008010120 A1 | 8/2008 |
|---|---|---|
| JP | 2008211338 A | 9/2008 |
| JP | 2008211339 A | 9/2008 |
| JP | 2008306232 A | 12/2008 |
| JP | 2009055306 A | 3/2009 |
| JP | 2009105482 A | 5/2009 |
| JP | 2009123002 A | 6/2009 |
| JP | 2009135803 A | 6/2009 |
| WO | WO 02078336 A1 | 10/2002 |

OTHER PUBLICATIONS

International Application Serial No. PCT/JP2010/004344, International Search Report mailed Jul. 27, 2010, 4 pgs.

* cited by examiner

*Primary Examiner* — Scott Sun
(74) *Attorney, Agent, or Firm* — RatnerPrestia

(57) ABSTRACT

A video/sound signal switching and distributing device makes connections to a plurality of video/sound signal receiving devices to be connected at startup of a system and performs authentication between itself and the plurality of video/sound signal receiving devices, thereby acquiring key selection information about a video/sound signal transmitting device and holding the key selection information. Even when another video/sound signal receiving device is connected to the video/sound signal transmitting device while one video/sound signal is already in the middle of displaying a view of the video/sound signal, the video/sound signal transmitting device and the video/sound signal switching and distributing device can again establish a connection without redoing mutual authentication. Hence, disconnection and re-connection of the video/sound signal can be performed without interruption of the video/sound signal being displayed for viewing purpose.

13 Claims, 9 Drawing Sheets

VIDEO/SOUND SIGNAL TRANSMITTING SYSTEM AND VIDEO/SOUND SIGNAL SWITCHING AND DISTRIBUTING DEVICE

TECHNICAL FIELD

The present invention relates to a video/sound signal transmitting system that includes a video/sound signal transmitting device, a video/sound signal switching and distributing device, and a video/sound signal receiving device, all of which are connected to each other by way of a digital interface, as well as to a video/sound signal switching and distributing device.

BACKGROUND ART

HDMI (High Definition Multimedia Interface) standards have already become prevailed as standards for transmitting digitized video/sound data in relation to a related-art video/sound signal transmitting system (see; for instance, Patent Document 1). Further, in relation to another video signal transmitting system, GVIF (Giga-bit Video Interface) standards have hitherto been known as standards used primarily for an in-car system (see; for instance, Patent Document 2).

Incidentally, when a digital video/sound signal is transmitted by use of a digital interface complying with the HDMI standards and the GVIF standards, transmission of the digital video/sound signal is allowed only when mutual authentication is established between a video/sound signal transmitting device and a video/sound signal receiving device by means of mutual authentication processing complying with HDCP (High-bandwidth Digital Content Protection System) specifications in order to prevent unauthorized copy of a digital signal from the viewpoint of copyright protection (see; for instance, Patent Document 3).

FIG. 8 shows an example configuration of a related-art video/sound signal transmitting system. In FIG. 8, reference numeral 80 designates a video/sound signal switching and distributing device, 20 designates a first video/sound signal transmitting device, 40 designates a first video/sound signal receiving device, and 50 designates a second video/sound signal receiving device. An HDMI interface is employed in the present example configuration as a digital interface.

The first video/sound signal transmitting device 20 has a function of outputting a digital video/sound signal in the form of an HDMI signal. The first video/sound signal transmitting device 20 also has a copyright protection function complying with the HDCP specifications. Each of the first video/sound signal receiving device 40 and the second video/sound signal receiving device 50 has a function of inputting a digital video/sound signal in the form of an HDMI signal. The first video/sound signal receiving device 40 and the second video/sound signal receiving device 50 each also have a copyright protection function complying with the HDCP specifications. The first video/sound signal receiving device 40 and the second video/sound signal receiving device 50 each additionally have a function of displaying a video and reproducing sounds for viewers from a received video/sound signal.

The video/sound signal switching and distributing device 80 is connected to the first video/sound signal transmitting device 20, the first video/sound signal receiving device 40, and the second video/sound signal receiving device 50 by way of the HDMI interface. The video/sound signal output from the first video/sound signal transmitting device 20 is output to either the first video/sound signal receiving device 40 or the second video/sound signal receiving device 50 or to both of them.

As shown in FIG. 8, when a plurality of video/sound signal receiving devices receive and display views of a video/sound signal output from a single video/sound signal transmitting device, the video/sound signal transmitting device is typically connected to each of the plurality of video/sound signal receiving devices by use of a video/sound signal switching and distributing device.

FIG. 9 is a flowchart showing example operation of the related-art video/sound signal transmitting system performed after startup of the system. In the descriptions, the first video/sound signal receiving device 40 is assumed to be receiving and displaying a view of, in an initial phase, a video/sound signal from the first video/sound signal transmitting device 20.

When the second video/sound signal receiving device 50 is connected to the video/sound signal switching and distributing device 80 (step S901) during the course of system operation (a step S900), the video/sound signal switching and distributing device 80 notifies the first video/sound signal transmitting device 20 about a change in connection status. In connection with the HDMI standards, notification is implemented by means of an HDP (Hot Plug Detect) signal. Upon receipt of then notification, the first video/sound signal transmitting device 20 cancels the connection between the first video/sound signal transmitting device 20 and the video/sound signal switching and distributing device 80 (step S902). Further, the video/sound signal switching and distributing device 80 terminates a connection to the first video/sound signal receiving device 40 (step S903).

Next, the video/sound signal switching and distributing device 80 commences mutual authentication between itself and respective devices connected thereto. Specifically, the video/sound signal switching and distributing device 80 performs mutual authentication between itself and the first video/sound signal transmitting device 20 (step S904), mutual authentication between itself and the first video/sound signal receiving device 40 (step S905), and mutual authentication between itself and the second video/sound receiving device 50 (step S906). After mutual authentication among the respective devices is completed, the video/sound signal switching and distributing device 80 notifies the first video/sound signal transmitting device 20 about completion of mutual authentication between itself and all of the devices downstream connected to the video/sound signal switching and distributing device 80 (step S907).

The first video/sound signal transmitting device 20 received an acknowledgement of completion of system startup acquires information required for authentication from the video/sound signal switching and distributing device 80, whereupon mutual authentication processing of an entire system, including the first video/sound signal transmitting device 20, is completed (step S908). From then on, the first video/sound signal receiving device 40 and the second video/sound signal receiving device 50 can receive and watch the video/sound signal output from the first video/sound signal transmitting device 20.

RELATED ART DOCUMENTS

PATENT DOCUMENTS

Patent Document 1: WO02/078336
Patent Document 2: JP-A-2009-055306
Patent Document 3: JP-A-2009-123002

DISCLOSURE OF THE INVENTION

Problem that the Invention is to Solve

However, in the related-art video/sound signal transmitting system including a plurality of video/sound signal receiving devices, if another video/sound signal receiving device tries to start receiving and displaying a view of a video/sound signal while one video/sound signal receiving device is already in the middle of receiving and displaying a view of a video/sound signal, a video/sound signal switching and distributing device detects the connection, requests a video/sound signal transmitting device to reset the system, temporarily cancels mutual authentication, redoes mutual authentication of the video/sound signal transmitting system, and starts transmitting video/sound signals after completion of mutual authentication. In a nutshell, the video/sound of the video/sound signal receiving device that has been receiving and displaying a view of the video/sound signal up until now is temporarily interrupted and resumed, which provides the viewers with a feeling of strangeness.

The present invention has been contrived to solve the drawbacks of the related art and is intended for providing a video/sound signal transmitting system including a plurality of video/sound signal receiving devices connected to a video/sound signal transmitting device by way of a video/sound signal switching and distributing device, wherein a video/sound that is now being displayed for viewing purpose can be incessantly transmitted when another video/sound signal receiving device starts receiving and displaying a view of the video/sound signal while one video/sound signal receiving device is already in the middle of receiving and displaying a view of the video/sound signal.

Means for Solving the Problem

In order to accomplish the objective, the present invention provides a video/sound signal transmitting system including a video/sound signal switching and distributing device having one or more video/sound signal receiving section and two or more video/sound signal transmitting sections; one or more video/sound signal transmitting device digitally connected to the video/sound signal receiving section; and two or more video/sound signal receiving devices digitally connected to the two or more video/sound signal transmitting sections, wherein the video/sound signal switching and distributing device performs mutual authentication between itself and the video/sound signal transmitting device and between itself and the two or more video/sound signal receiving devices when a startup signal showing startup of the video/sound signal transmitting system is detected, thereby transiting to a state where mutual authentication between the video/sound signal transmitting device and the two or more video/sound signal receiving devices is already established; and wherein the video/sound signal switching and distributing device holds key selection information that is individually generated as a result of performance of the mutual authentication between itself and the two or more video/sound signal receiving devices and that shows completion of the mutual authentication, even after the connection to any of the two or more video/sound signal receiving devices is terminated.

Advantage of the Invention

According to the present invention, the video/sound signal transmitting system, in which a plurality of video/sound signal receiving devices are connected to a video/sound signal transmitting device by way of a video/sound signal switching and distributing device, yields an advantage of being able to continually transmit a video/sound signal that is now being displayed for viewing purpose when another video/sound signal receiving device starts receiving and displaying a view of the video/sound signal while one video/sound signal receiving device is already in the middle of receiving and displaying a view of the video/sound signal.

EMBODIMENTS FOR IMPLEMENTING THE INVENTION (First Embodiment)

A video/sound signal switching and distributing device according to a first embodiment of the present invention is hereunder described by reference to FIG. 1.

Figure 1:
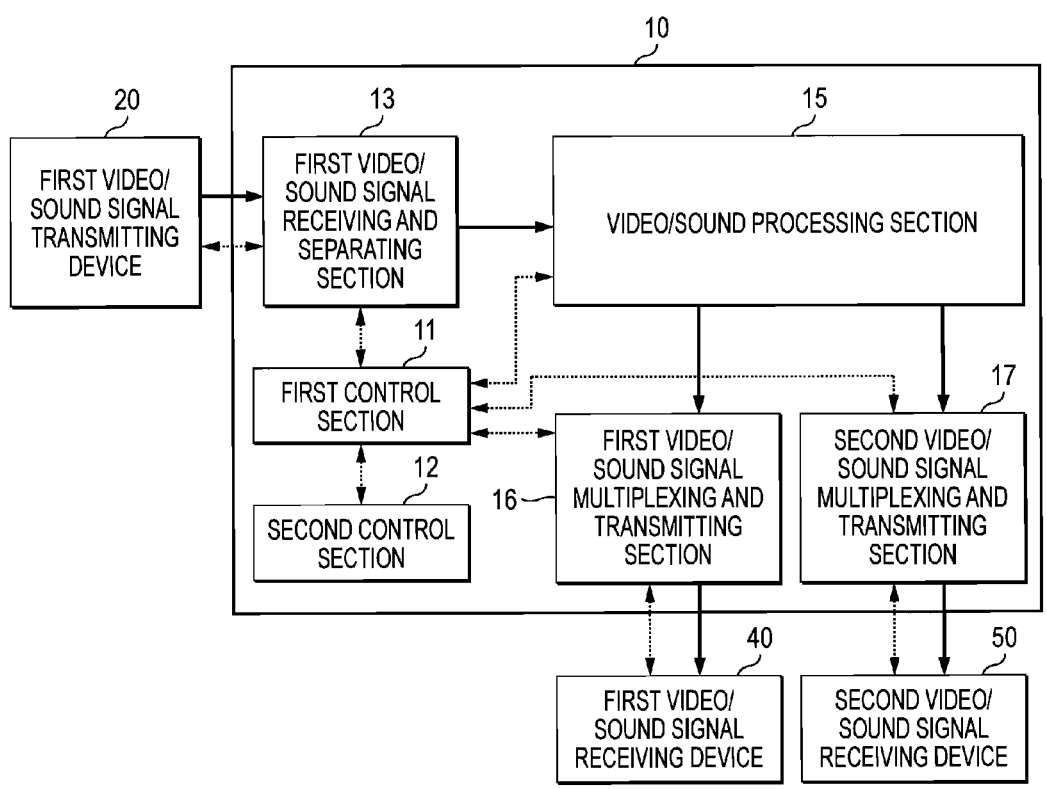
FIG. 1 is a block diagram of a video/sound signal transmitting system according to a first embodiment of the present invention.

FIG. 1 is a block diagram of a video/sound signal transmitting system of the first embodiment of the present invention.

In FIG. 1, a video/sound signal switching and distributing device 10 is connected to a first video/sound signal transmitting device 20 having a function of outputting a digital video/sound signal; and a first video/sound signal receiving device 40 and a second video/sound signal receiving device 50, each of which has a function of receiving and reproducing the digital video/sound signal, and all of the devices are connected together by way of a digital interface that performs mutual authentication processing complying with HDCP specifications. The video/sound signal switching and distributing device 10 includes a first control section 11; a second control section 12; a first video/sound signal receiving and separating section 13; a video/sound processing section 15; a first video/sound signal multiplexing and transmitting section 16; and a second video/sound signal multiplexing and transmitting section 17.

The first control section 11 includes; for instance, a CPU, ROM, and RAM. The CPU executes a computer program stored in the ROM while using the RAM as a work area. Specific processing of such a first control section 11 will be described later. Roughly speaking, the first control section 11 establishes communications with the first video/sound signal transmitting device 20 by way of the first video/sound signal receiving and separating section 13; the first video/sound signal receiving device 40 by way of the first video/sound signal multiplexing and transmitting section 16; and the second video/sound signal receiving device 50 by way of the second video/sound signal multiplexing and transmitting section 17. The first control section 11 manages key selection information about connected devices and the video/sound signal switching and distributing device 10 and sends an acknowledgement to the first video/sound signal transmitting device 20 as required.

The second control section 12 includes; for instance, a CPU, ROM, and RAM. The CPU executes the computer program stored in the ROM while using the RAM as a work area. Specific processing of such a second control section 12 will be described later. Roughly speaking, the second control section 12 manages a power status of the system including the video/sound signal switching and distributing device 10 and an operating status of the video/sound signal switching and distributing device 10. For instance, when the system is installed in an interior room of an automobile, the second control section 12 monitors an accessory-ON (ACC_ON) signal showing initiation of system operation at startup of the automobile engine and notifies the first control section 11 of the status.

The first video/sound signal receiving and separating section 13 receives the video/sound signal input from the first video/sound signal transmitting device 20 and transmits the thus-received video/sound signal to the video/sound processing section 15. Connected to the first control section 11, the first video/sound signal receiving and separating section 13 exchanges control information with the first video/sound signal transmitting device 20.

Pursuant to a command from the first control section 11, the video/sound processing section 15 transmits the video/sound signal input from the first video/sound signal receiving and separating section 13 to the first video/sound signal multiplexing and transmitting section 16 and the second video/sound signal multiplexing and transmitting section 17.

The first video/sound signal multiplexing and transmitting section 16 receives the video/sound signal input from the video/sound processing section 15 and transmits the video/sound signal to the first video/sound signal receiving device 40. Connected to the first control section 11, the first video/sound signal multiplexing and transmitting section 16 exchanges control information with the first video/sound signal receiving device 40.

The second video/sound signal multiplexing and transmitting section 17 receives a video/sound signal input from the video/sound processing section 15 and transmits the video/sound signal to the second video/sound signal receiving device 50. Connected to the first control section 11, the second video/sound signal multiplexing and transmitting section 17 exchanges control information with the second video/sound signal receiving device 50.

Figure 2:
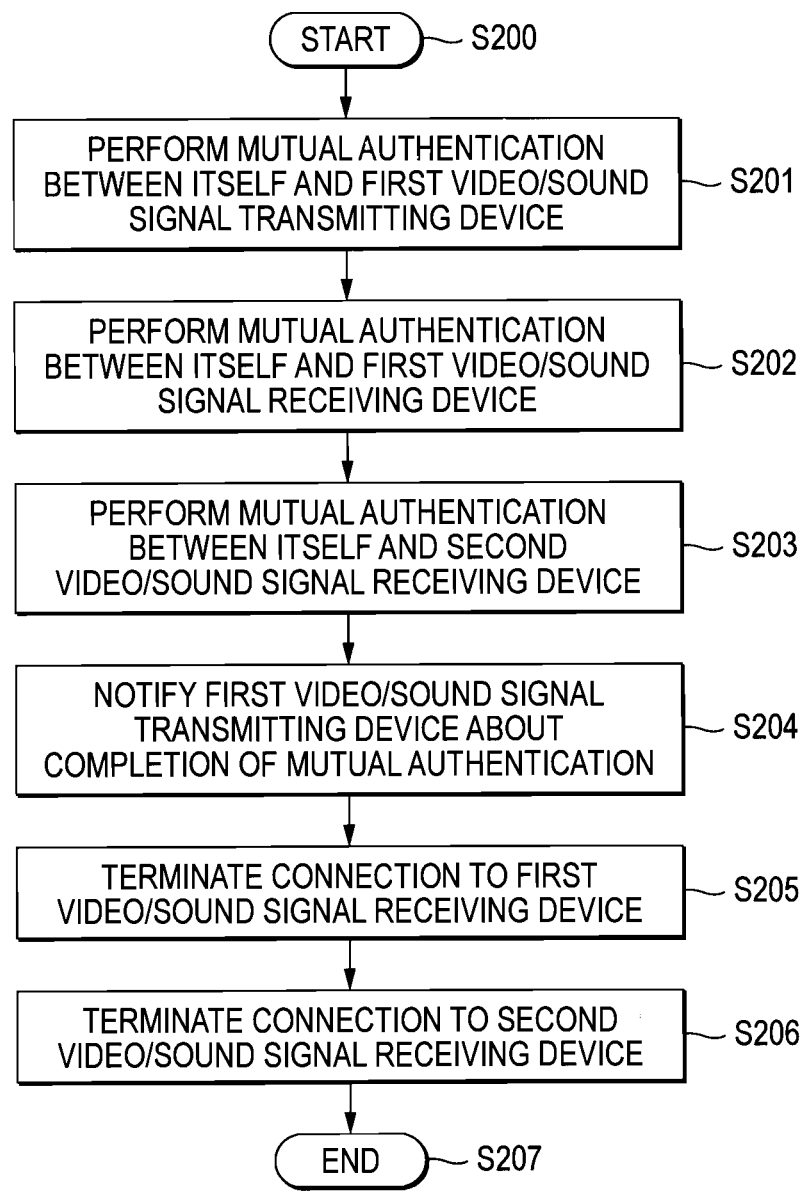
FIG. 2 is a flowchart showing operation of a video/sound signal switching and distributing device of the first embodiment of the present invention performed at startup of the system.

There are hereunder given explanations of processing operation of the video/sound signal switching and distributing device 10 configured in the manner as mentioned above. FIG. 2 is a flowchart showing operation of the video/sound signal switching and distributing device 10 of the first embodiment of the present invention performed at startup of the system.

At startup of the system (step S200), the first control section 11 receives a system startup acknowledgement (as an example, detection of an ACC_ON signal) from the second control section 12, thereupon starting mutual authentication between itself and respective devices connected thereto. Specifically, the first control section 11 performs mutual authentication between itself and the first video/sound signal transmitting device 20 (step S201); mutual authentication between itself and the first video/sound signal receiving device 40 (step S202); and mutual authentication between itself and the second video/sound signal receiving device 50 (step S203).

After completion of mutual authentication between itself and the respective devices, the first control section 11 notifies the first video/sound signal transmitting device 20 about completion of system startup by way of the first video/sound signal receiving and separating section 13 (step S204). The first video/sound signal transmitting device 20 that has received the acknowledgement of completion of system startup acquires information required for authentication from the video/sound signal switching and distributing device 10, whereupon mutual authentication processing of an entire system, including the first video/sound signal transmitting device 20, is completed.

The first control section 11 next terminates a connection to the first video/sound signal receiving device 40 (step S205). On this occasion, the first control section 11 terminates the connection while holding the information (hereinafter called "first key selection information") used for mutual authentication between itself and the first video/sound signal receiving device 40. The first control section 11 additionally terminates a connection to the second video/sound signal receiving device 50 (step S206).

The first control section 11, in this case, terminates the connection while holding the information (hereinafter called "second key selection information") used for mutual authentication between itself and the second video/sound signal receiving device 50. The thus-held information is stored in a RAM area held in the first control section 11. System startup is then completed (step S207).

Figure 3:
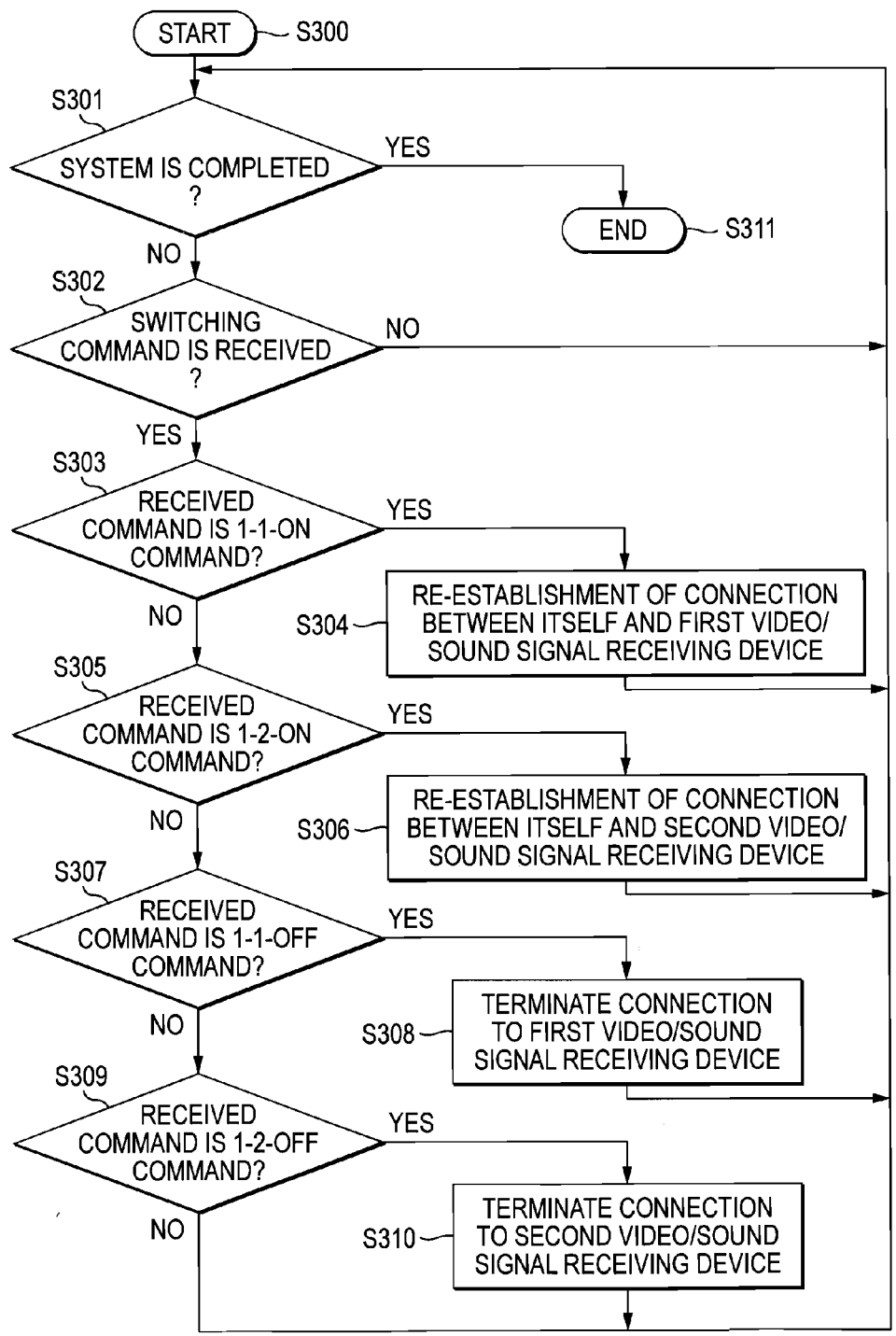
FIG. 3 is a flowchart showing operation of the video/sound signal switching and distributing device of the first embodiment of the present invention performed after startup of the system.

FIG. 3 is a flowchart showing operation of the video/sound signal switching and distributing device 10 of the first embodiment of the present invention performed after startup of the system.

Received an acknowledgement of system completion from the second control section 12 (step S301) after startup of the system (step S300), the first control section 11 discards the first key selection information and the second key selection information held in itself, thus completing processing (step S311).

Received a command from the second control section 12 (step S302), the first control section 11 starts mutual authentication between itself and the first video/sound signal receiving device 40 if the command corresponds to a 1-1-ON command that is an acknowledgement for starting display of the first video/sound signal receiving device 40 (step S303). From the first key selection information held in itself, the first control section 11 ascertains that hardware connected to the first video/sound signal multiplexing and transmitting section 16 is the first video/sound signal receiving device 40. The first control section 11 thereupon starts transmitting to the first video/sound signal receiving device 40 the video/sound signal from the first video/sound signal transmitting device 20 already connected to the first video/sound signal multiplexing and transmitting section 16 (step S304).

On this occasion, the hardware connected to the first video/sound signal multiplexing and transmitting section 16 is the first video/sound signal receiving device 40 that is the same hardware as that connected to the first video/sound signal multiplexing and transmitting section 16 just before. Hence, there is no necessity to temporarily terminate the connection between the first video/sound signal transmitting device 20 and the first video/sound signal receiving and separating section 13.

To put it briefly, even when the first video/sound signal receiving device 40 is connected while the second video/sound signal receiving device 50 is in the course of receiving a video/sound signal from the first video/sound signal transmitting device 20, the video/sound signal received by the second video/sound signal receiving device 50 is not interrupted.

Received, from the second control section 12, a 1-2-ON command that is an acknowledgement for starting display of the second video/sound signal receiving device 50 (step S305), the first control section 11 starts mutual authentication between itself and the second video/sound signal receiving device 50. From the second key selection information held in itself, the first control section 11 ascertains that hardware connected to the second video/sound signal multiplexing and transmitting section 17 is the second video/sound signal receiving device 50. Further, the first control section 11 starts transmitting to the second video/sound signal receiving device 50 the video/sound signal from the first video/sound signal transmitting device 20 already connected to the first control section 11 (step S306).

On this occasion, the hardware connected to the second video/sound signal multiplexing and transmitting section 17 is the second video/sound signal receiving device 50 that is the same hardware as that connected to the second video/sound signal multiplexing and transmitting section 17 just before. Hence, there is no necessity to temporarily terminate the connection between the first video/sound signal transmitting device 20 and the first video/sound signal receiving and separating section 13. Briefly speaking, even when the second video/sound signal receiving device 50 is connected while the first video/sound signal receiving device 40 is in the course of receiving a video/sound signal from the first video/sound signal transmitting device 20, the video/sound signal received by the first video/sound signal receiving device 40 is not interrupted.

Received, from the second control section 12, a 1-1-OFF command that is an acknowledgement for completing the display of the first video/sound signal receiving device 40 (step S307), the first control section 11 terminates the connection between itself and the first video/sound signal receiving device 40 in the same manner as at startup while holding the first key selection information (step S308).

Received, from the second control section 12, a 1-2-OFF command that is an acknowledgement for completing the display of the second video/sound signal receiving device 50 (step S309), the first control section 11 terminates the connection between itself and the second video/sound signal receiving device 50 in the same manner as at startup while holding the second key selection information (step S310).

Figure 4:
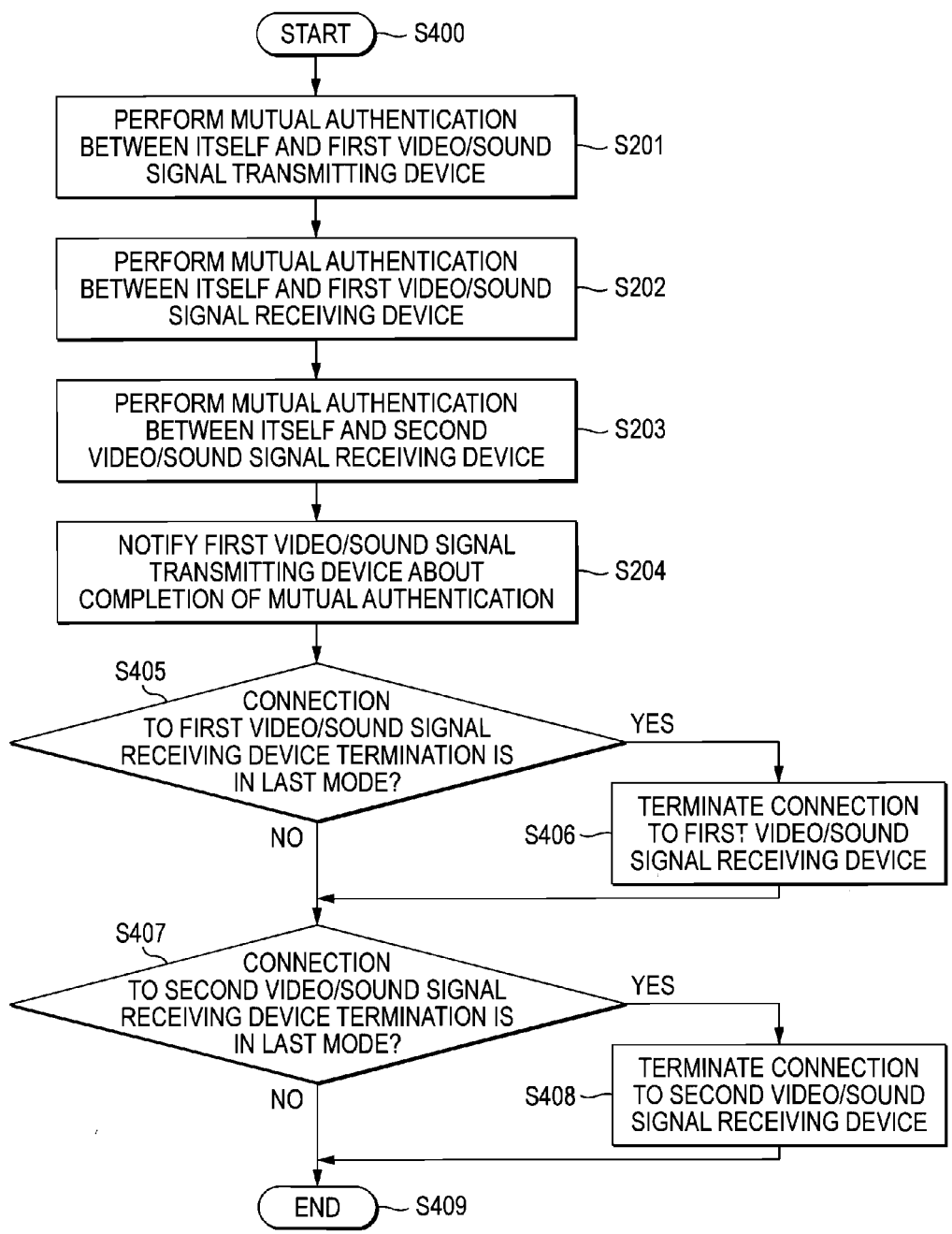
FIG. 4 is a flowchart showing operation of the video/sound signal switching and distributing device of the first embodiment of the present invention in a last mode performed at startup.

An explanation is now given to operation performed at startup by the system that stores a status achieved at the time of completion (i.e., a last mode). FIG. 4 is a flowchart showing operation of the video/sound signal switching and distributing device 10 of the first embodiment of the present invention in a last mode performed at startup.

The first control section 11 receives an acknowledgement from the second control section 12 at startup of the system (step S400), thereupon starting mutual authentication between itself and the respective connected devices. Specifically, the first control section 11 performs mutual authentication between itself and the first video/sound signal transmitting device 20 (step S201); mutual authentication between itself and the first video/sound signal receiving device 40 (step S202); and mutual authentication between itself and the second video/sound signal receiving device 50 (step S203).

After completion of mutual authentication between itself and the respective devices, the first control section 11 notifies the first video/sound signal transmitting device 20 about completion of system startup by way of the first video/sound signal receiving and separating section 13 (step S204). The first video/sound signal transmitting device 20 that has received the acknowledgement of completion of system startup acquires information required for authentication from the video/sound signal switching and distributing device 10, whereupon mutual authentication processing of an entire system, including the first video/sound signal transmitting device 20, is completed.

When the system is completed in the last mode while the connection to the first video/sound signal receiving device 40 remained terminated (step S405), the first control section 11 terminates the connection to the first video/sound signal receiving device 40 (step S406). On this occasion, the first control section 11 terminates the connection while holding the first key selection information.

When the system was completed in the last mode while the connection to the second video/sound signal receiving device 50 remained terminated (step S407), the first control section 11 terminates the connection to the second video/sound signal receiving device 50 (step S408). In this case, the first control section 11 terminates the connection while holding the second key selection information.

As mentioned above, according to the present embodiment, the video/sound signal switching and distributing device 10 makes a connection to a plurality of video/sound signal receiving devices to be connected, authenticating the devices at startup of the system. Further, the video/sound signal switching and distributing device 10 acquires and holds key selection information. As a result, even when another video/sound signal receiving device starts receiving and displaying a view of the video/sound signal while one video/sound signal receiving device is already in the middle of receiving and displaying a view of the video/sound signal, the video/sound signal transmitting device can again establish the connection to the video/sound signal switching and distributing device without redoing mutual authentication. Hence, disconnection and reconnection of the video/sound signal can be performed without interrupting the video/sound signal that is now being displayed for viewing purpose.

The configuration described in connection with the present embodiment is useful particularly for a system including a plurality of video/sound signal receiving devices, in which positions of the video/sound signal receiving devices and a video/sound signal switching and distributing device are fixed; for instance, an in-car video/sound signal transmitting system.

Although the present embodiment has described the case of the single video/sound signal transmitting device, the same advantages can be yielded even when a plurality of video/sound signal transmitting devices are connected to a single video/sound signal switching and distributing device, so long as the respective video/sound signal transmitting devices are caused to perform operation described in connection with the present embodiment.

(Second Embodiment)

A video/sound signal transmitting system of a second embodiment of the present invention is hereunder described by reference to the drawings.

Figure 5:
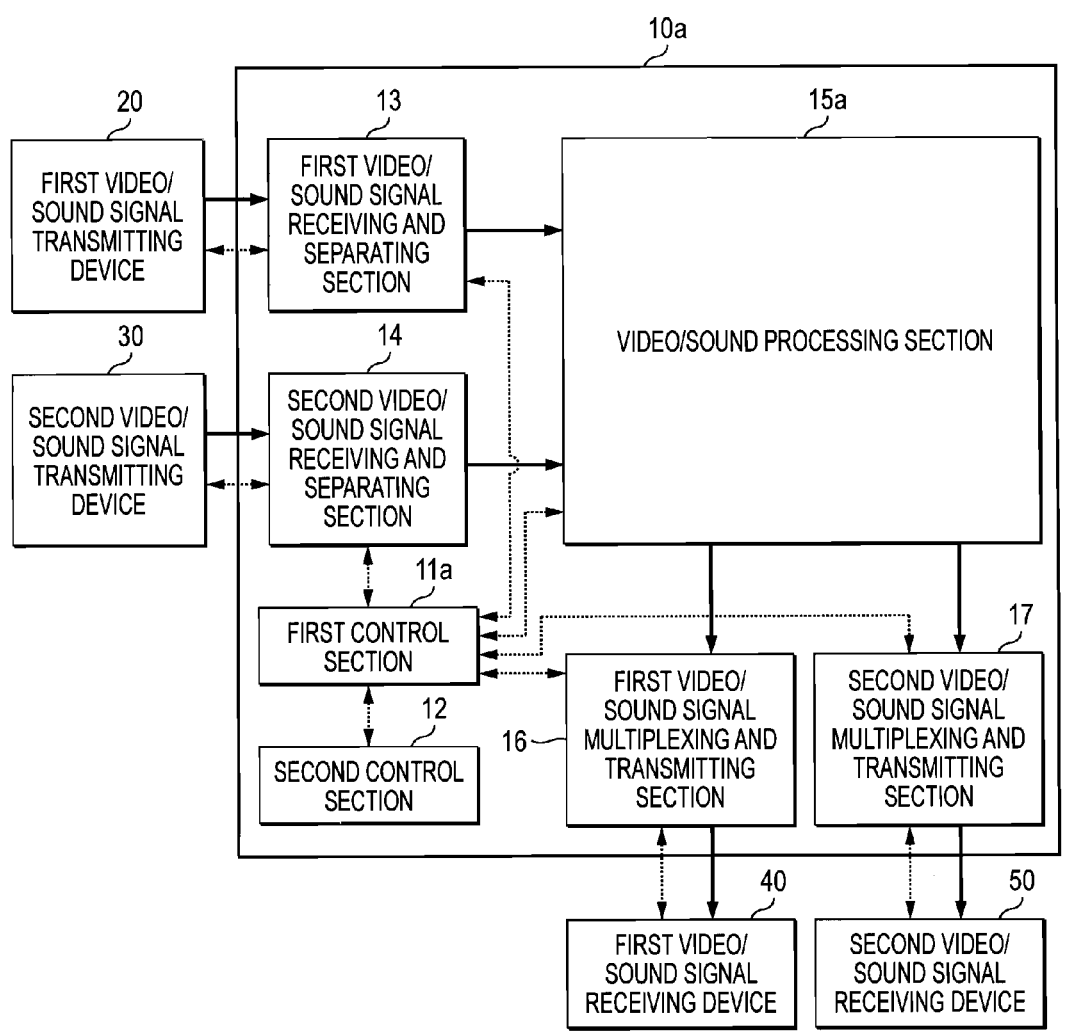
FIG. 5 is a block diagram of a video/sound signal transmitting system of a second embodiment of the present invention.

FIG. 5 is a block diagram of the video/sound signal transmitting system of the second embodiment of the present invention.

In the present embodiment, components that are similar to those described in connection with the first embodiment are assigned the same reference numerals, and their detailed descriptions are omitted.

As shown in FIG. 5, a difference between the second embodiment and the first embodiment lies in that a second video/sound signal transmitting device 30 with a function of outputting a digital video/sound signal is additionally provided and that the video/sound signal switching and distributing device 10 is replaced with a video/sound signal switching and distributing device 10a in the present embodiment.

The video/sound signal switching and distributing device 10a of the present embodiment is additionally provided with a second video/sound signal receiving and separating section 14. Further, the first control section 11 is replaced with a first control section 11a of the present embodiment, and the video/sound processing section 15 is replaced with a video/sound processing section 15a of the present embodiment.

The first control section 11a of the present embodiment includes; for instance, a CPU, ROM, and RAM. The CPU executes a computer program stored in the ROM while using the RAM as a work area. Specific processing of such a first control section 11a will be described later. Roughly speaking, the first control section 11a establishes communications with the first video/sound signal transmitting device 20 by way of the first video/sound signal receiving and separating section 13; the second video/sound signal transmitting device 30 by way of the second video/sound signal receiving and separating section 14; the first video/sound signal receiving device 40 by way of the first video/sound signal multiplexing and transmitting section 16; and the second video/sound signal receiving device 50 by way of the second video/sound signal multiplexing and transmitting section 17. The first control section 11a manages key selection information about connected devices and the video/sound signal switching and distributing device 10a, and sends an acknowledgement to the first video/sound signal transmitting device 20 and the second video/sound signal transmitting device 30, as required.

The second video/sound signal receiving and separating section 14 receives a video/sound signal input from the second video/sound signal transmitting device 13 and transmits the thus-received video/sound signal to the video/sound processing section 15a. Connected to the first control section 11a, the second video/sound signal receiving and separating section 14 exchanges control information with the second video/sound signal transmitting device 30.

The video/sound processing section 15a of the present embodiment transmits the video/sound signal input from the second video/sound signal receiving and separating section 13 to the first video/sound signal multiplexing and transmitting section 16 and transmits the signal input from the second video/sound signal receiving and separating section 14 to the second video/sound signal multiplexing and transmitting section 17 in accordance with the command from the first control section 11a.

Figure 6:
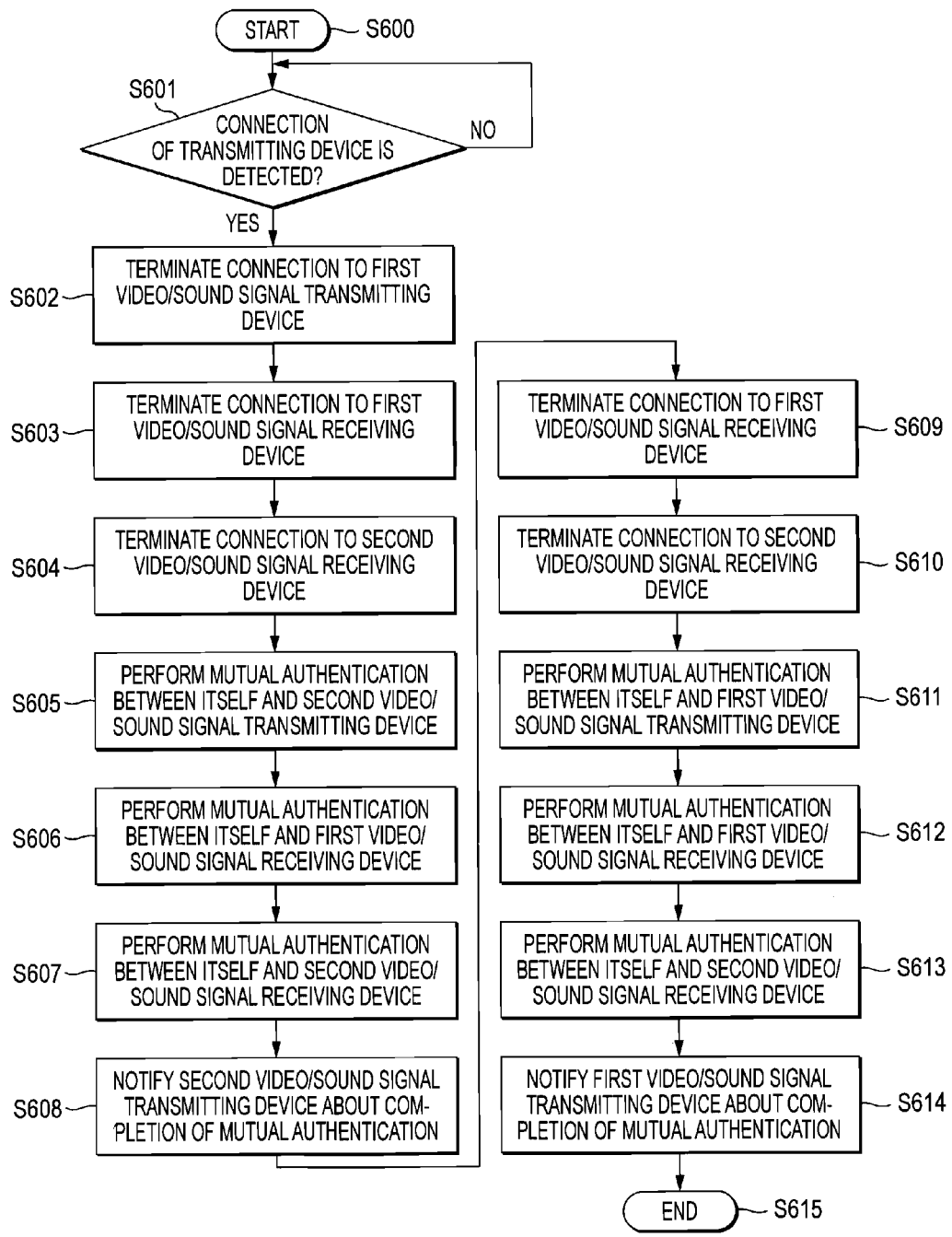
FIG. 6 is a flowchart showing operation of a video/sound signal switching and distributing device of the second embodiment of the present invention performed at the time of connection of a transmitting device.

Processing operation of the video/sound signal transmitting system configured in the manner as mentioned above is hereunder described. FIG. 6 is a flowchart showing operation of the video/sound signal switching and distributing device 10a of the second embodiment of the present invention performed at the time of connection of a transmitting device.

In FIG. 6, the first video/sound signal receiving device 40 and the second video/sound signal receiving device 50 are assumed to be receiving, in an initial phase, a video/sound signal from the first video/sound signal transmitting device 20. It is also assumed that the second video/sound signal transmitting device 30 remains unconnected to the video/sound signal switching and distributing device 10a; namely, physically disconnected and has not yet undergone mutual authentication. When the second video/sound signal transmitting device 30 is connected to the video/sound signal switching and distributing device 10a (step S601) in the course of the video/sound signal transmitting system being in operation in an initial phase (step S600), the first control section 11a receives an acknowledgement from the second video/sound signal receiving and separating section 14, thereby detecting a connection.

Upon detection of connection, the first control section 11a suspends transmission of the video/sound signal at the outset. Specifically, the connection to the first video/sound signal transmitting device 20 is terminated (step S602); the connection to the first video/sound signal receiving device 40 is terminated (step S603); and the connection to the second video/sound signal receiving device 50 is terminated (step S604).

The first control section 11a performs mutual authentication between itself and the second video/sound signal transmitting device 30 (step S605); mutual authentication between itself and the first video/sound signal receiving device 40 (step S606); and mutual authentication between itself and the second video/sound signal receiving device 50 (step S607). After completion of mutual authentication between itself and the respective devices, the first control section 11a notifies the second video/sound signal transmitting device 30 about completion of system startup by way of the second video/sound signal receiving and separating section 14 (step S608). The second video/sound signal transmitting device 30 that has received the acknowledgement of completion of system startup acquires information required for authentication from the video/sound signal switching and distributing device 10a, whereupon mutual authentication processing of an entire system, including the second video/sound signal transmitting device 30, is completed.

The first control section 11a terminates the connection to the first video/sound signal receiving device 40 (step S609). On this occasion, the first control section 11a terminates the connection while holding the information (hereinafter called "first key selection information a") employed in mutual authentication between itself and the first video/sound signal receiving device 40. Further, the first control section 11a terminates the connection to the second video/sound signal receiving device (step S610). On this occasion, the first control section 11a terminates the connection while holding the information (hereinafter called "second key selection information a") employed in mutual authentication between itself and the second video/sound signal receiving device 50. The thus-held information is stored in; for instance, a RAM area belonging to the first control section 11a.

The first control section 11a redoes mutual authentication between itself and the first video/sound signal transmitting device 20 (step S611), mutual authentication between itself and the first video/sound signal receiving device 40 (step S612), and mutual authentication between itself and the second video/sound signal receiving device 50 (step S613).

After completion of mutual authentication between itself and the respective devices, the first control section 11a notifies the first video/sound signal transmitting device 20 about connection completion by way of the first video/sound signal receiving and separating section 13 (step S614). The first video/sound signal transmitting device 20 that has received the acknowledgement of connection completion acquires information required for authentication from the video/sound signal switching and distributing device 10a, whereupon mutual authentication processing of an entire system, including the first video/sound signal transmitting device 20, is completed.

Figure 7:
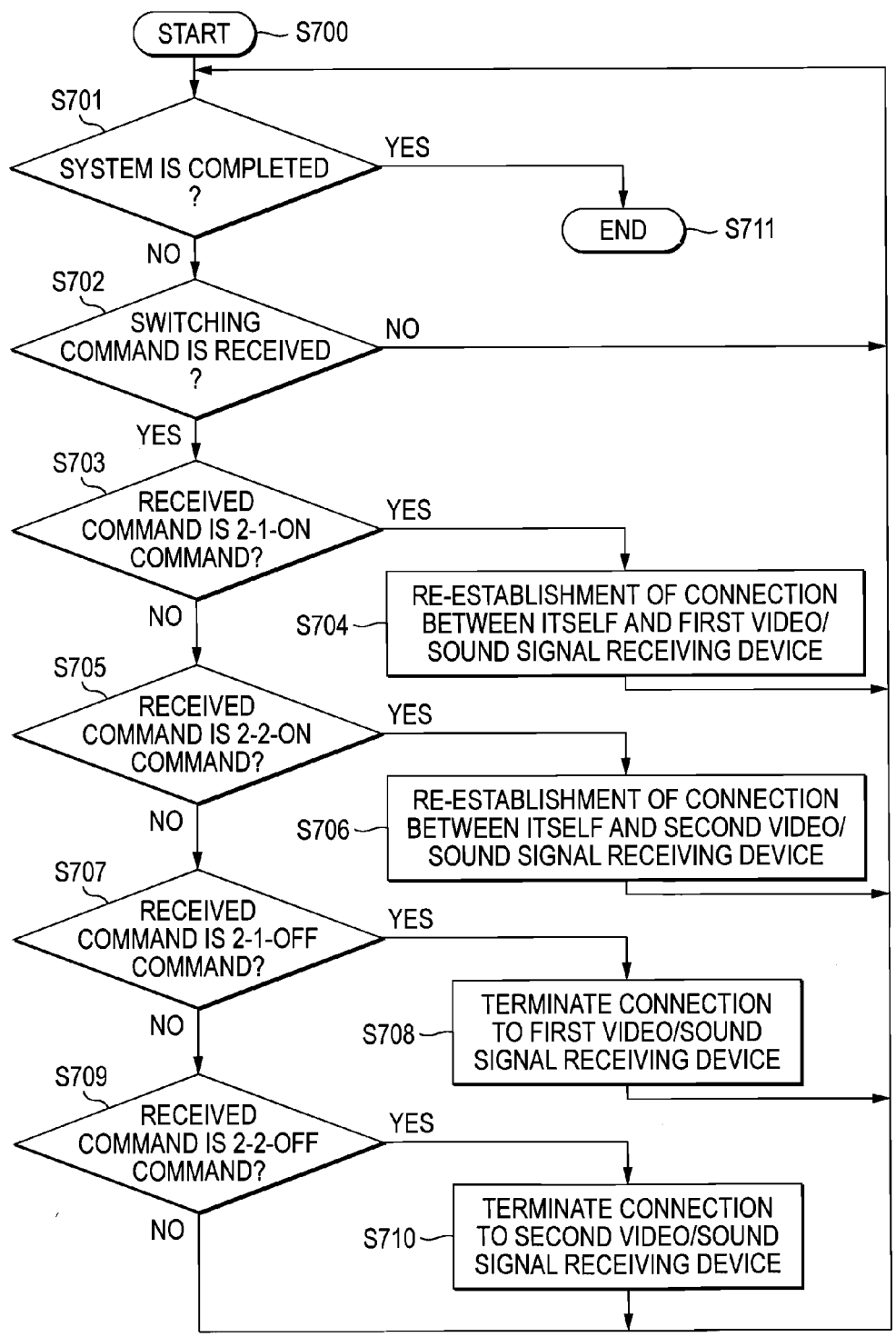
FIG. 7 is a flowchart showing operation of the video/sound signal switching and distributing device of the second embodiment of the present invention performed after startup of the system.
Figure 8:
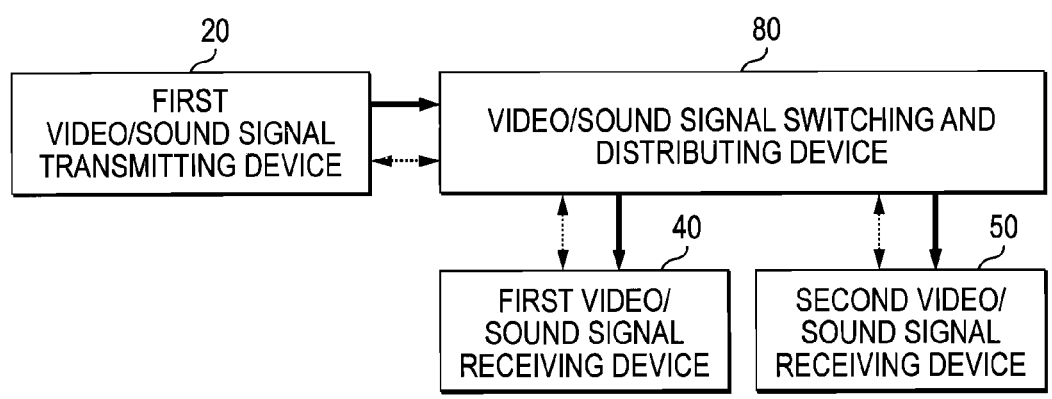
FIG. 8 is a block diagram of a video/sound signal transmitting system of the related-art.
Figure 9:
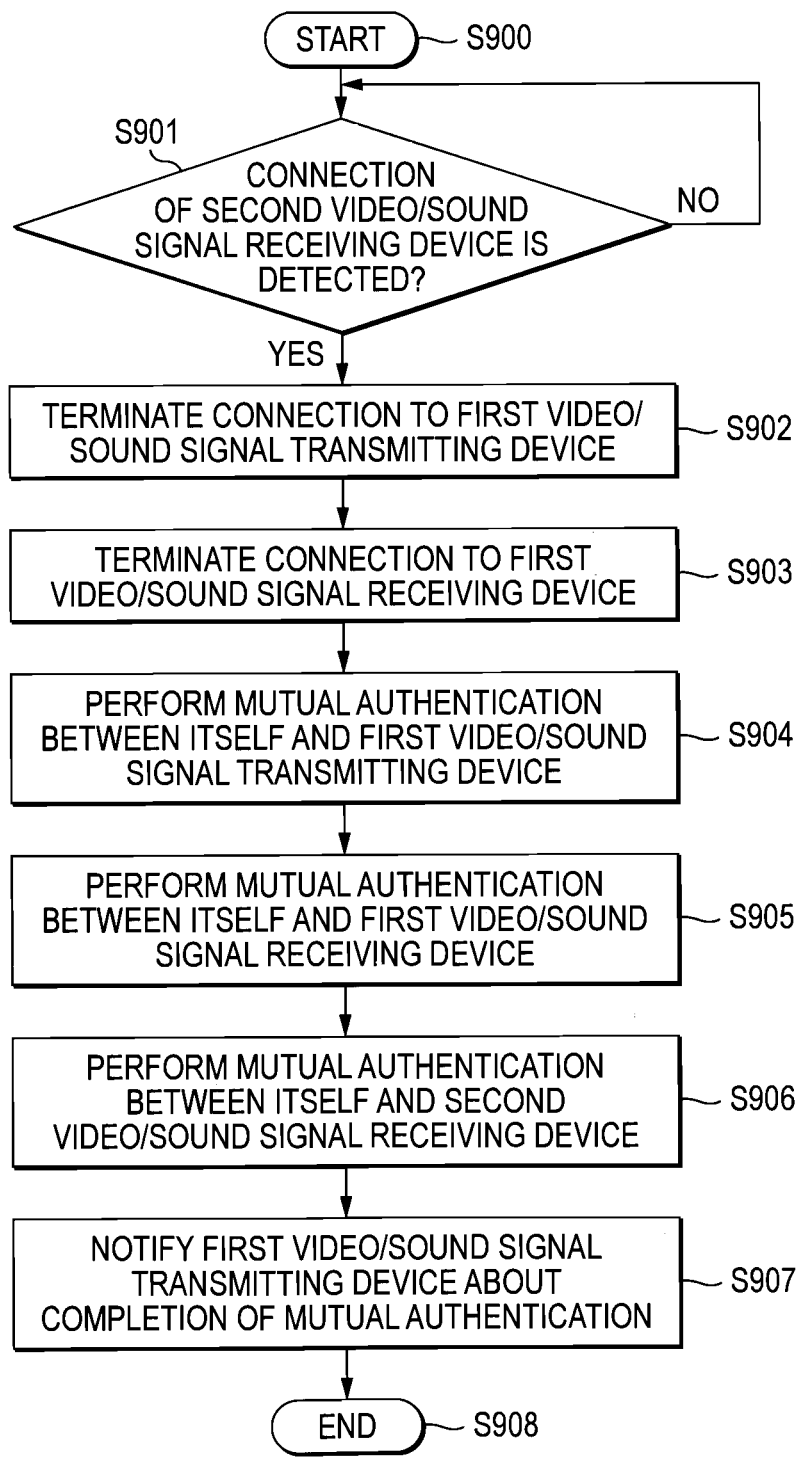
FIG. 9 is a flowchart showing example operation of a video/sound signal switching and distributing device of the related art performed after startup of the system.

FIG. 7 is a flowchart showing operation of the video/sound signal switching and distributing device 10a of the second embodiment of the present invention performed after startup of the system.

Received a system completion acknowledgement from the second control section 12 (step S701) after startup of the system (step S700), the first control section 11a discards the held key selection information and terminates processing (step S711).

Received a command from the second control section 12 (step S702) that is a 2-1-ON command equivalent to an acknowledgement for letting the first video/sound signal receiving device 40 start receiving a video/sound signal from the second video/sound signal transmitting device 30 (step S703), the first control section 11a starts mutual authentication between itself and the first video/sound signal receiving device 40. The first control section 11a ascertains from the first key selection information "a" held therein that hardware connected to the first video/sound signal multiplexing and transmitting section 16 is the first video/sound signal receiving device 40. The first control section 11a then starts transmitting to the first video/sound signal receiving device 40 the video/sound signal from the second video/sound signal transmitting device 30 that is already connected to the first control section 11a (step S704).

On this occasion, the hardware connected to the first video/sound signal multiplexing and transmitting section 16 is the first video/sound signal receiving device 40 that is the same hardware as that connected to the first video/sound signal multiplexing and transmitting section 16 just before. Hence, there is no necessity to temporarily terminate the connection between the second video/sound signal transmitting device 30 and the second video/sound signal receiving and separating section 14. To put it briefly, even when the first video/sound signal receiving device 40 is connected while the second video/sound signal receiving device 50 is in the course of receiving a video/sound signal from the second video/sound signal transmitting device 30, the video/sound signal received by the second video/sound signal receiving device 50 is not interrupted.

Received, from the second control section 12, a 2-2-ON command that is an acknowledgement for starting display of the second video/sound signal transmitting device 30 (step S705), the first control section 11a starts mutual authentication between itself and the second video/sound signal receiving device 50.

From the second key selection information "a" held in itself, the control section 11a ascertains that hardware connected to the second video/sound signal multiplexing and transmitting section 17 is the second video/sound signal receiving device 50. The control section 11a then starts transmitting to the second video/sound signal receiving device 50 the video/sound signal from the second video/sound signal transmitting device 30 already connected to the control section 11a (step S706).

On this occasion, the hardware connected to the second video/sound signal multiplexing and transmitting section 17 is the second video/sound signal receiving device 50 that is the same hardware as that connected to the second video/sound signal multiplexing and transmitting section 17 just before. Hence, there is no necessity to temporarily terminate the connection between the second video/sound signal transmitting device 30 and the first video/sound signal receiving and separating section 13.

To put it briefly, even when the second video/sound signal receiving device 50 is connected while the first video/sound signal receiving device 40 is in the course of receiving a video/sound signal from the first video/sound signal transmitting device 20, the video/sound signal received by the first video/sound signal receiving device 40 is not interrupted.

Received, from the second control section 12, a 2-1-OFF command that is an acknowledgement for completing the display of the first video/sound signal receiving device 40 (step S707), the first control section 11a terminates the connection between itself and the first video/sound signal receiving device 40 in the same manner as at startup while holding the first key selection information "a" (step S708).

Received, from the second control section 12, a 2-2-OFF command that is an acknowledgement for completing the display of the second video/sound signal receiving device 50 (step S709), the first control section 11a terminates the connection between itself and the second video/sound signal receiving device 50 in the same manner as at startup while holding the second key selection information "a" (step S710).

As mentioned above, according to the present embodiment, when the second video/sound signal transmitting device 30 is newly added to the video/sound signal transmitting system, the second video/sound signal transmitting device 30 is temporarily connected to the plurality of video/sound signal receiving devices to be connected. Mutual authentication between the second video/sound signal transmitting device 30 and the plurality of video/sound signal receiving devices is carried out, thereby establishing connections between them. The video/sound signal switching and distributing device 10a stores key selection information and terminates the connections. As a result, in subsequent operation, even when another video/sound signal receiving device is connected while one video/sound signal receiving device is already in the middle of receiving and displaying a view of a video/sound signal from the second video/sound signal transmitting device 30, the video/sound signal switching and distributing device 10a can redo establishment of connection to the video/sound signal transmitting device without redoing mutual authentication. Hence, disconnection and reconnection of the video/sound signal can be performed without interrupting the video/sound signal that is now being displayed for viewing purpose.

In the present embodiment, if information showing that "connection and authentication is in progress" is displayed on a display screen; for instance, a message "An external device is connected. The device is now being authenticated" appears on the first video/sound signal receiving device 40 and the second video/sound signal receiving device 50 when the second video/sound signal transmitting device 30 is connected, the viewers can grasp a current status, so that a video/sound signal transmitting system involving a reduction in the feeling of strangeness at the time of switching can be materialized. Further, the message can also be displayed only on a video/sound signal receiving device that is in the middle of receiving and displaying a view of another video/sound signal; for instance, a video/sound signal from another video/sound signal transmitting device.

The procedures for authentication and termination of connection described in connection with the respective embodiments are for illustration purpose, and following the procedures is not always required. For instance, in relation to authentication, authentication of the first video/sound signal receiving device 40 can also be established after completion of authentication of the second video/sound signal receiving device 50. Alternatively, authentication of both the first video/sound signal receiving device 40 and the second video/sound signal receiving device 50 may also be performed simultaneously.

The respective embodiments have described the case in which the video/sound signal switching and distributing device is single. However, even when a plurality of video/sound signal switching and distributing devices are connected to a single video/sound signal transmitting device, the video/sound signal switching and distributing device can perform operation in the same manner.

In each of the embodiments, a single digital interface or different digital interfaces can be used as an interface between the video/sound signal transmitting device and the video/sound signal switching and distributing device and an interface between the video/sound signal switching and distributing device and the video/sound signal receiving devices. For instance, the video/sound signal transmitting system can also be implemented in the same manner even when the former interface is embodied in compliance with the HDMI standards and when the latter interface is embodied in compliance with the GVIF standards.

The embodiments have been explained on condition that the HDCP specifications are used as a digital interface copyright protection scheme. However, the digital interface copyright protection scheme is not limited to the HDCP specifications, and another copyright protection scheme can also be used.

Moreover, there may also be employed a configuration for letting the user select whether to execute processing of the video/sound signal switching and distributing device in each of the embodiments.

In each of the embodiments, there are cases where, when power of the video/sound signal transmitting device is automatically shut off, the video/sound signal switching and distributing device detects power shutoff, thereupon discarding authentication information held in itself. In order to prevent discarding of the held authentication information, the power of the video/sound signal transmitting device can also be prevented from being automatically shut off by means of a method for periodically sending a startup signal to the video/sound signal transmitting device from the video/sound signal switching and distributing device or the video/sound signal receiving device or a method for transmitting a suspension signal for requesting postpone of shutoff in response to an acknowledgement when a power shutoff acknowledgement is transmitted immediately before the power of the video/sound signal transmitting device is shut off.

In each of the embodiments, processing details have been described by means of the configuration in which the first control section 11 and the second control section 12 are separated from each other. The processing details are not limited to the configuration. For instance, the present embodiments can be perfectly implemented in the same manner; for instance, even if the number of control sections is set to one.

In each of the embodiments, the video/sound signal receiving device connected to the video/sound signal switching and distributing device 10 is set to a number of two. However, the embodiments can be embodied in the same manner even when the video/sound signal receiving device is provided in the number of three or more.

Although the signal transmitted in each of the embodiments is taken as a video/sound signal, the signal is not limited to the video/sound signal. For instance, the embodiments can be embodied in the same manner even when only a video signal is employed.

Although the present invention has been described in detail, the descriptions are illustrative in view of all meanings and not restrictive. It is construed that the present invention be susceptible to other many alterations or modifications without departing the scope of the present invention.

The present patent application is based on Japanese Patent Application (JP-2009-223989) filed on Sep. 29, 2009, the entire subject matter of which is incorporated herein by reference.

INDUSTRIAL APPLICABILITY

As having been described, the video/sound signal transmitting system and the video/sound signal switching and distributing device of the present invention are suitable for a system having a plurality of video/sound signal receiving devices; particularly, a system in which a positional and connection relationship between a video/sound signal switching and distributing device and a video/sound signal receiving device remains unchanged, such as an in-car environment.

DESCRIPTIONS OF THE REFERENCE NUMERALS AND SYMBOLS

10 VIDEO/SOUND SIGNAL SWITCHING AND DISTRIBUTING DEVICE
20 FIRST VIDEO/SOUND SIGNAL TRANSMITTING DEVICE
30 SECOND VIDEO/SOUND SIGNAL TRANSMITTING DEVICE
40 FIRST VIDEO/SOUND SIGNAL RECEIVING DEVICE
50 SECOND VIDEO/SOUND SIGNAL RECEIVING DEVICE
11 FIRST CONTROL SECTION
12 SECOND CONTROL SECTION
13 FIRST VIDEO/SOUND SIGNAL RECEIVING AND SEPARATING SECTION
14 SECOND VIDEO/SOUND SIGNAL RECEIVING AND SEPARATING SECTION
15 VIDEO/SOUND PROCESSING SECTION
16 FIRST VIDEO/SOUND SIGNAL MULTIPLEXING AND TRANSMITTING SECTION
17 SECOND VIDEO/SOUND SIGNAL MULTIPLEXING AND TRANSMITTING SECTION
80 VIDEO/SOUND SIGNAL SWITCHING AND DISTRIBUTING DEVICE OF RELATED-ART EMBODIMENT
10a VIDEO/SOUND SIGNAL SWITCHING AND DISTRIBUTING DEVICE
11a FIRST CONTROL SECTION
15a VIDEO/SOUND PROCESSING SECTION

The invention claimed is:
1. A video/sound signal transmitting system, comprising:
a video/sound signal switching and distributing device:
including:
one or more video/sound signal receiving section; and
two or more video/sound signal transmitting sections,
one or more video/sound signal transmitting device digitally connected to the video/sound signal receiving section; and two or more video/sound signal receiving devices digitally connected to the two or more video/sound signal transmitting sections, wherein the video/sound signal switching and distributing device performs mutual authentication between itself and the video/sound signal transmitting device and between itself and the two or more video/sound signal receiving devices when a startup signal indicating startup of the video/sound signal transmitting system is detected, thereby transiting to a state where authentication of a system encompassing the video/sound signal transmitting device and the two or more video/sound signal receiving devices is established; and wherein the video/sound signal switching and distributing device holds key selection information that is individually generated as a result of performance of the mutual authentication between itself and the two or more video/sound signal receiving devices and that shows completion of the mutual authentication, even after the connection to any of the two or more video/sound signal receiving devices is terminated.

2. The video/sound signal transmitting system according to claim 1, further comprising:

a second video/sound signal transmitting device connected to the video/sound signal switching and distributing device, wherein the video/sound signal switching and distributing device performs mutual authentication between itself and the second video/sound signal transmitting device and between itself and the connected two or more video/sound signal receiving devices when the second video/sound signal transmitting device is connected, thereby transiting to a state where authentication of a system encompassing the second video/sound signal transmitting device and the two or more video/sound signal receiving device is established; and wherein the video/sound signal switching and distributing device holds second key selection information that is individually generated as a result of performance of the mutual authentication between itself and the two or more video/sound signal receiving devices and that shows completion of the mutual authentication, even after the connection to any of the two or more video/sound signal receiving devices is terminated.

3. A video/sound signal switching and distributing device including one or more video/sound signal receiving section and two or more video/sound signal transmitting sections, wherein the video/sound signal switching and distributing device performs mutual authentication between itself and a video/sound signal transmitting device connected to the video/sound signal receiving section and between itself and video/sound signal receiving devices connected to the two or more video/sound signal transmitting sections when a startup signal showing startup of a video/sound signal transmitting system is detected, thereby leading to a state where there is already established authentication of a system encompassing the video/sound signal transmitting device and the two or more video/sound signal receiving devices; and wherein the video/sound signal switching and distributing device holds key selection information that is individually generated as a result of performance of the mutual authentication between itself and the two or more video/sound signal receiving devices and that shows completion of the mutual authentication, even after the connection to any of the two or more video/sound signal receiving devices is terminated.

4. The video/sound signal switching and distributing device according to claim 3, wherein the video/sound signal switching and distributing device performs mutual authentication between itself and a second video/sound signal transmitting device and between itself and the connected two or more video/sound signal receiving devices when the second video/sound signal transmitting device is connected to the video/sound signal receiving section, thereby transiting to a state where authentication of a system encompassing the second video/sound signal transmitting device and the two or more video/sound signal receiving device is established; and wherein the video/sound signal switching and distributing device holds second key selection information that is individually generated as a result of performance of the mutual authentication between itself and the two or more video/sound signal receiving devices and that shows completion of the mutual authentication, even after the connection to any of the two or more video/sound signal receiving devices is terminated.

5. The video/sound signal transmitting system according to claim 1, wherein the mutual authentication is performed in conformance with HDCP specification.

6. The video/sound signal transmitting system according to claim 1, wherein the video/sound signal transmitting system is provided in an automobile.

7. The video/sound signal transmitting system according to claim 1, wherein the startup signal is an accessory-on signal used at the time of activation of power of in-car hardware.

8. A video/sound signal transmitting method employed in a video/sound signal transmitting system including: a video/sound signal switching and distributing device having one or more video/sound signal receiving section and two or more video/sound signal transmitting sections; one or more video/sound signal transmitting device digitally connected to the video/sound signal receiving section; and two or more video/sound signal receiving devices digitally connected to the two or more video/sound signal transmitting sections, wherein the video/sound signal switching and distributing device performs:

a first mutual authentication step of performing mutual authentication between itself and the video/sound signal transmitting device and between itself and the two or more video/sound signal receiving devices when a startup signal showing startup of the video/sound signal transmitting system is detected;

a second mutual authentication step of transiting to a state where authentication of a system encompassing the video/sound signal transmitting device and the two or more video/sound signal receiving devices is established; and a key selection information holding step of holding key selection information that is individually generated as a result of performance of the mutual authentication between itself and the two or more video/sound signal receiving devices and that shows completion of the mutual authentication, even after the connection to any of the two or more video/sound signal receiving devices is terminated.

9. The video/sound signal transmitting method according to claim 8, wherein the video/sound signal transmitting system includes a second video/sound signal transmitting device connected to the video/sound signal switching and distributing device, wherein the video/sound signal switching and distributing device performs:

a third mutual authentication step of performing mutual authentication between itself and the second video/ sound signal transmitting device and between itself and the connected two or more video/sound signal receiving devices when the second video/sound signal transmitting device is connected;

a fourth mutual authentication step of transiting to a state where authentication of a system encompassing the second video/sound signal transmitting device and the two or more video/sound signal receiving device is established; and a second key selection information holding step of holding second key selection information that is individually generated as a result of performance of the mutual authentication between itself and the two or more video/sound signal receiving devices and that shows completion of the mutual authentication, even after the connection to any of the two or more video/sound signal receiving devices is terminated.

10. A computer program employed in a video/sound signal transmitting system including: a video/sound signal switching and distributing device having one or more video/sound signal receiving section and two or more video/sound signal transmitting sections; one or more video/sound signal transmitting device digitally connected to the video/sound signal receiving section; and two or more video/sound signal receiving devices digitally connected to the two or more video/sound signal transmitting sections, wherein the computer program is for causing the video/sound signal switching and distributing device to perform a first mutual authentication step of performing mutual authentication between itself and the video/sound signal transmitting device and between itself and the two or more video/sound signal receiving devices when a startup signal showing startup of the video/sound signal transmitting system is detected;

a second mutual authentication step of transiting to a state where authentication of a system encompassing the video/sound signal transmitting device and the two or more video/sound signal receiving devices is established; and a key selection information holding step of holding key selection information that is individually generated as a result of performance of the mutual authentication between itself and the two or more video/sound signal receiving devices and that shows completion of the mutual authentication, even after the connection to any of the two or more video/sound signal receiving devices is terminated.

11. The computer program according to claim 10, wherein the video/sound signal transmitting system includes a second video/sound signal transmitting device connected to the video/sound signal switching and distributing device, wherein the computer program is for causing the video/sound signal switching and distributing device to perform:

a third mutual authentication step of performing mutual authentication between itself and the second video/sound signal transmitting device and between itself and the connected two or more video/sound signal receiving devices when the second video/sound signal transmitting device is connected a fourth mutual authentication step of transiting to a state where authentication of a system encompassing the second video/sound signal transmitting device and the two or more video/sound signal receiving device is established; and a second key selection information holding step of holding second key selection information that is individually generated as a result of performance of the mutual authentication between itself and the two or more video/sound signal receiving devices and that shows completion of the mutual authentication, even after the connection to any of the two or more video/sound signal receiving devices is terminated.

12. An integrated circuit provided in a video/sound signal transmitting system including: a video/sound signal switching and distributing device having one or more video/sound signal receiving section and two or more video/sound signal transmitting sections; one or more video/sound signal transmitting device digitally connected to the video/sound signal receiving section; and two or more video/sound signal receiving devices digitally connected to the two or more video/sound signal transmitting sections, wherein the integrated circuit causes the video/sound signal switching and distributing device to perform processing:

a first mutual authentication step of performing mutual authentication between itself and the video/sound signal transmitting device and between itself and the two or more video/sound signal receiving devices when a startup signal showing startup of the video/sound signal transmitting system is detected;

a second mutual authentication step of transiting to a state where authentication of a system encompassing the video/sound signal transmitting device and the two or more video/sound signal receiving devices is established; and a key selection information holding step of holding key selection information that is individually generated as a result of performance of the mutual authentication between itself and the two or more video/sound signal receiving devices and that shows completion of the mutual authentication, even after the connection to any of the two or more video/sound signal receiving devices is terminated.

13. The integrated circuit according to claim 12, wherein the video/sound signal transmitting system includes a second video/sound signal transmitting device connected to the video/sound signal switching and distributing device, wherein the integrated circuit causes the video/sound signal switching and distributing device to perform:

a third mutual authentication step of performing mutual authentication between itself and the second video/sound signal transmitting device and between itself and the connected two or more video/sound signal receiving devices when the second video/sound signal transmitting device is connected a fourth mutual authentication step of transiting to a state where authentication of a system encompassing the second video/sound signal transmitting device and the two or more video/sound signal receiving device is established; and a second key selection information holding step of holding second key selection information that is individually generated as a result of performance of the mutual authentication between itself and the two or more video/sound signal receiving devices and that shows completion of the mutual authentication, even after the connection to any of the two or more video/sound signal receiving devices is terminated.

* * * * *